US011129377B1

(12) United States Patent
Williams et al.

(10) Patent No.: US 11,129,377 B1
(45) Date of Patent: Sep. 28, 2021

(54) AVIAN NEST DETERRENT SYSTEM

(71) Applicant: ADVANTAGE ENGINEERS, LLC, Mechanicsburg, PA (US)

(72) Inventors: Matthew D. Williams, Dallastown, PA (US); Abraham Sharp, Glen Rock, PA (US)

(73) Assignee: KLEINFELDER, INC., San Diego, CA (US)

( * ) Notice: Subject to any disclaimer, the term of this patent is extended or adjusted under 35 U.S.C. 154(b) by 0 days.

(21) Appl. No.: 16/416,767

(22) Filed: May 20, 2019

Related U.S. Application Data

(60) Provisional application No. 62/674,084, filed on May 21, 2018.

(51) Int. Cl.
*A01M 29/32* (2011.01)
*E04B 1/62* (2006.01)

(52) U.S. Cl.
CPC ............... *A01M 29/32* (2013.01); *E04B 1/62* (2013.01)

(58) Field of Classification Search
CPC .................................. A01M 29/32; E04B 1/62
See application file for complete search history.

(56) References Cited

U.S. PATENT DOCUMENTS

| | | | |
|---|---|---|---|
| 2,923,382 A * | 2/1960 | Heldstab | E04H 12/20 52/148 |
| 4,143,437 A * | 3/1979 | Voykin | A01M 29/32 441/1 |
| 5,092,088 A * | 3/1992 | Way | E04B 1/92 52/101 |
| 5,606,830 A * | 3/1997 | Townsend, Jr. | A01M 29/32 256/11 |
| 5,713,160 A * | 2/1998 | Heron | E04D 13/004 52/101 |
| 5,884,426 A * | 3/1999 | Ishida | A01M 29/26 116/22 A |
| 6,003,471 A * | 12/1999 | Ohba | A01M 29/26 119/713 |
| 6,418,674 B1 * | 7/2002 | Deraedt | A01M 29/32 119/903 |
| 6,836,992 B2 * | 1/2005 | Rains | A01M 29/32 114/90 |
| 6,863,012 B2 * | 3/2005 | Levin | B63B 17/00 114/221 R |
| 6,918,214 B2 * | 7/2005 | Sabine | A01K 15/02 119/469 |
| 7,036,278 B1 * | 5/2006 | Donoho | A01M 29/06 43/1 |
| 8,919,051 B1 * | 12/2014 | Echemendia | E04H 12/20 52/146 |
| 8,973,309 B2 * | 3/2015 | Amir | E04H 12/10 52/80.2 |
| 2003/0182876 A1 * | 10/2003 | Landers | A01M 29/32 52/101 |

(Continued)

*Primary Examiner* — James M Ference
(74) *Attorney, Agent, or Firm* — McNees Wallace & Nurick LLC

(57) ABSTRACT

A network of fibers is attached to an antenna platform of a telecommunications tower to deter the nesting of raptors. The fibrous network does not extend the overall height of the tower and includes a plurality of angled fibers crossing the vertical space defined by the antenna platform. The fibers may be attached to the antenna masts or supporting elements of the platform.

9 Claims, 5 Drawing Sheets

(56) References Cited

U.S. PATENT DOCUMENTS

| | | | | |
|---|---|---|---|---|
| 2004/0200439 A1* | 10/2004 | Thomas | A01M 29/24 | 43/98 |
| 2005/0210769 A1* | 9/2005 | Harvey | E04H 12/24 | 52/101 |
| 2006/0283370 A1* | 12/2006 | Kurtzweil | B63B 17/00 | 114/364 |
| 2009/0049764 A1* | 2/2009 | McCulloch | A01M 29/32 | 52/101 |
| 2009/0188437 A1* | 7/2009 | Davis | A01K 31/12 | 119/537 |
| 2010/0251633 A1* | 10/2010 | Sabine | E04B 1/72 | 52/101 |
| 2011/0168489 A1* | 7/2011 | Grome | A62B 35/0068 | 182/9 |
| 2011/0239558 A1* | 10/2011 | Bowie | E04B 1/72 | 52/202 |
| 2012/0124918 A1* | 5/2012 | Zimmerman | E04B 1/62 | 52/101 |
| 2012/0174498 A1* | 7/2012 | Anderson, Jr. | H01Q 1/1242 | 52/101 |
| 2012/0286956 A1* | 11/2012 | Lee | A01M 29/10 | 340/573.2 |
| 2013/0042544 A1* | 2/2013 | Sabine | A01M 29/32 | 52/101 |
| 2013/0055657 A1* | 3/2013 | Parker | A01M 29/32 | 52/101 |
| 2013/0092892 A1* | 4/2013 | Donoho | A01M 29/32 | 256/39 |
| 2013/0213306 A1* | 8/2013 | Davis | A01K 31/12 | 119/28.5 |
| 2014/0144391 A1* | 5/2014 | Ashworth | A01M 29/32 | 119/713 |
| 2015/0335006 A1* | 11/2015 | Lee | A01M 29/22 | 119/713 |
| 2018/0055038 A1* | 3/2018 | Kaiser | A01M 29/32 | |

* cited by examiner

DETAIL B

DETAIL A

AVIAN NEST DETERRENT SYSTEM

CROSS REFERENCE TO RELATED APPLICATIONS

This application claims priority to U.S. Provisional Application 62/674,084, filed May 21, 2018, the contents of which are hereby incorporated by reference in their entirety.

FIELD OF THE INVENTION

The present invention is directed an avian nest deterrent system.

BACKGROUND OF THE INVENTION

Raptors nesting on telecommunications towers have become an increasing problem for the industry. Telecommunications towers are typically located on high elevations which are unobstructed by vegetation or buildings, or along large bodies of water. Raptors typically prefer nesting sites having an unobstructed view of the surrounding landscape and access to fresh water, making telecommunications towers an ideal nesting platform.

Raptors, including Osprey, Bald Eagles, and Golden Eagles are protected under the Migratory Bird Treaty Act (MBTA). Eagles are additionally protected under the Bald and Golden Eagle Protection Act.

These protections restrict cellular service providers and tower owners from conducting maintenance on or at a telecommunications tower having an active nest. The active nesting season is approximately six months long, which prevents upgrades and maintenance at telecommunications sites having an active nest for long periods of time. Raptors also reuse their nesting sites year-after-year, resulting in telecommunications sites being repeatedly inaccessible for service for extended periods of time.

BRIEF DESCRIPTION OF THE INVENTION

In an embodiment, a network of monofilament fibers is attached to an antenna platform of a telecommunications tower to deter the nesting of raptors. The fibrous network does not extend the overall height of the tower and includes a plurality of angled fibers crossing the vertical space defined by the antenna platform. The fibers may be attached to the antenna masts or supporting elements of the platform.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an avian nest deterrent system to deter raptors from nesting on telecommunications towers and equipment. Embodiments of the present disclosure, for example, in comparison to concepts failing to include one or more of the features disclosed herein, provide a fibrous network which visually and physically deters raptor access to and nesting on antenna platforms frequently used as part of telecommunications towers. The avian nest deterrent system does not expand or extend the spatial parameters of the tower, such as height or width, thus avoiding regulatory issues associated with increased tower height.

Figure 1:
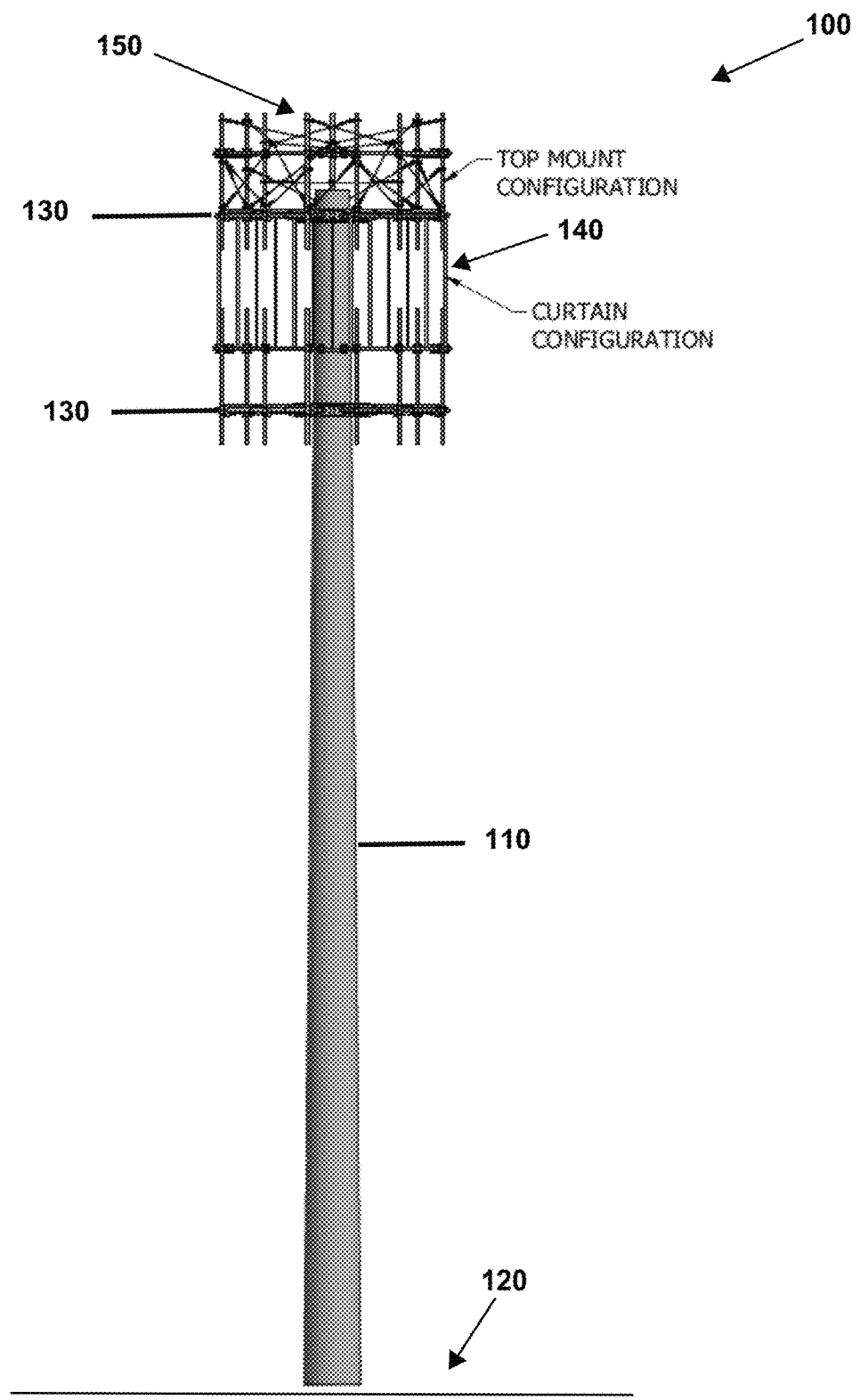
FIG. 1 is a view of a telecommunications tower having an avian deterrent system attached thereto, according to an embodiment.

FIG. 1 is a schematic view of a telecommunications tower 100. The telecommunications tower includes a central support 110 extending upward from the ground 120. In some embodiments, central support 110 may be a monopole tower. In other embodiments, the central support may include a guyed tower or a self-support. One or more antenna platforms 130 are attached to the central support 110. As illustrated in FIG. 1, two antenna platforms 130, an upper platform and a lower platform, are attached to the central support 110. A plurality of fibers 140 extend between the two antenna platforms 130 in a spaced apart curtain configuration defining an avian deterred region between the two antenna platforms 130. In some embodiments, the fibers 140 are spaced apart at distances including about 8 inches to about 24 inches, about 14 inches to about 22 inches, about 16 inches to about 20 inches, and/or about 18 inches. In some embodiments, the fibers 140 may include monofilaments, braided fibers, and/or microfilament fibers. In one embodiment, the fibers 140 are monofilament fibers.

A network of fibers 150 forms a plurality of spaced apart fibers above the upper platform 130 in a spaced apart top mount configuration. In one embodiment, the height above the ground 120 of the fiber network 150 does not exceed the height of the tower 100.

In order to resist breakage due to animals and environmental effects, nylon fibers having a test strength of between 80 and 200 pounds, between 100 and 175 pounds, between 120 and 160 pounds, and/or between 130 and 150 pounds may be used as part of the fiber networks 140, 150. In some embodiments, the nylon fibers may be nylon monofilament fibers. In some embodiments, the nylon monofilaments may have a diameter between 0.01 inches and 0.8 inches, such as between 0.044 inches to 0.052 inches. In an alternative embodiment, fibers formed from polyvinylidene fluoride or ultra-high molecular weight polyethylene may be substituted for some or all of the nylon fibers. In some embodiments, some or all of the fibers may be clear or translucent. The fibers may be monofilaments, braided fibers, or microfilament fibers.

Figure 2:
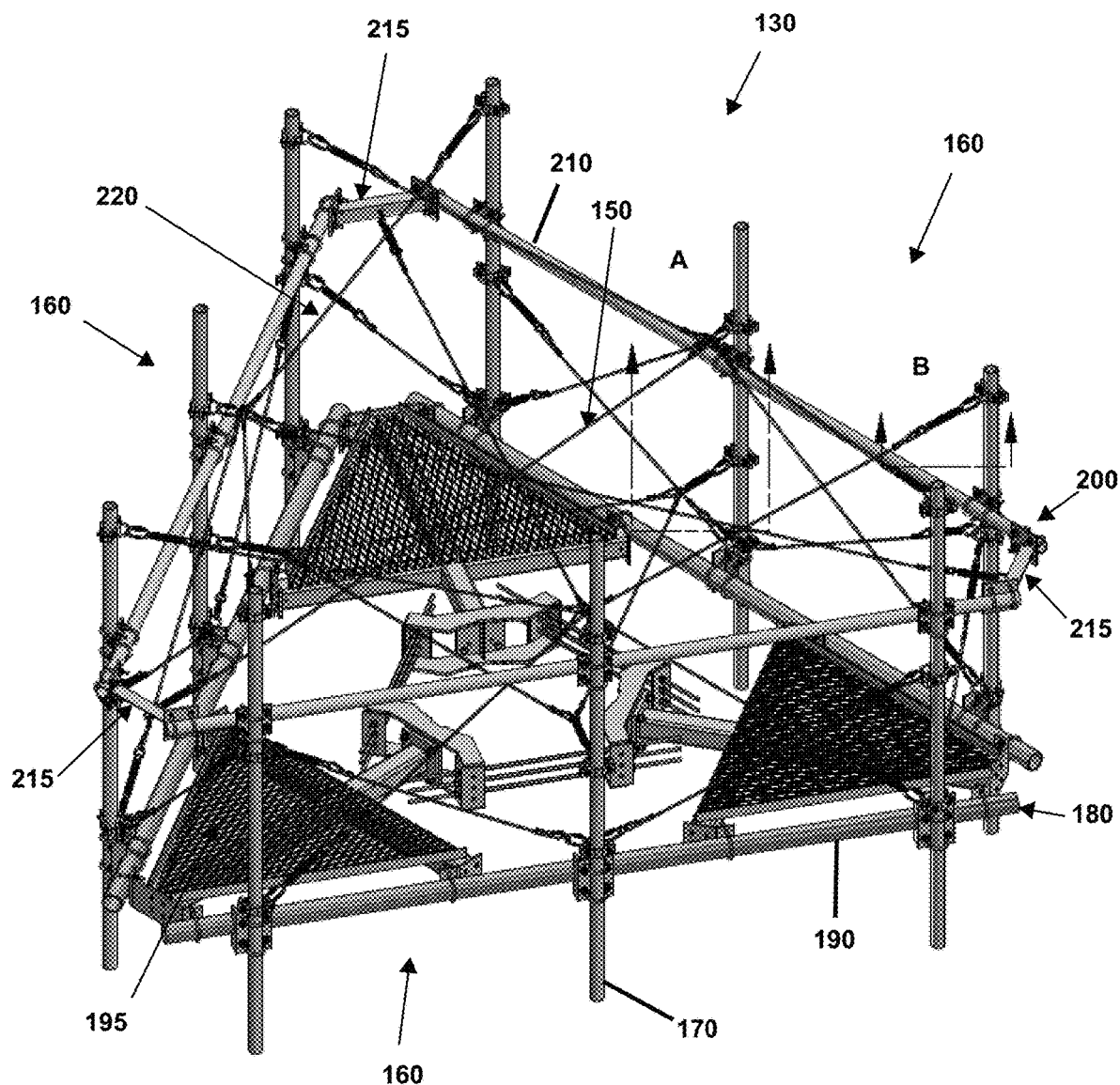
FIG. 2 is a view of an antenna platform having an avian deterrent system attached thereto, according to an embodiment.
Figure 5:
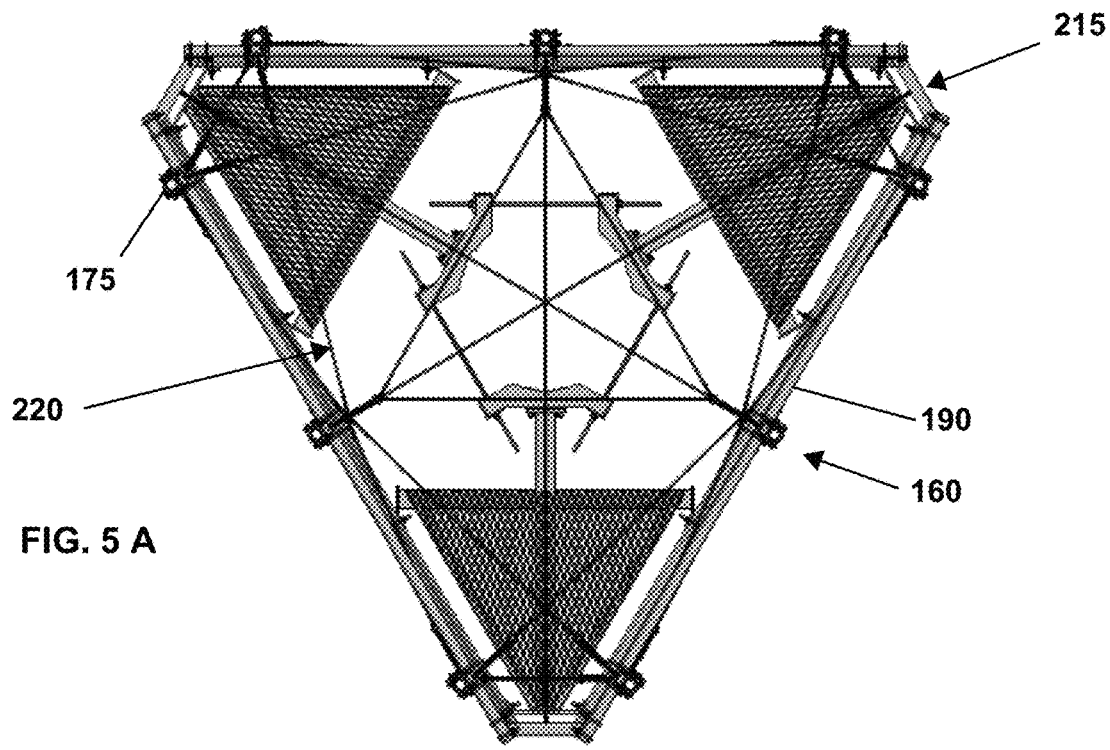
FIGS. 5A and 5B are top and side views of the antenna platform of FIG. 2, having a top mount avian deterrent system attached thereto, according to an embodiment.
Figure 5:
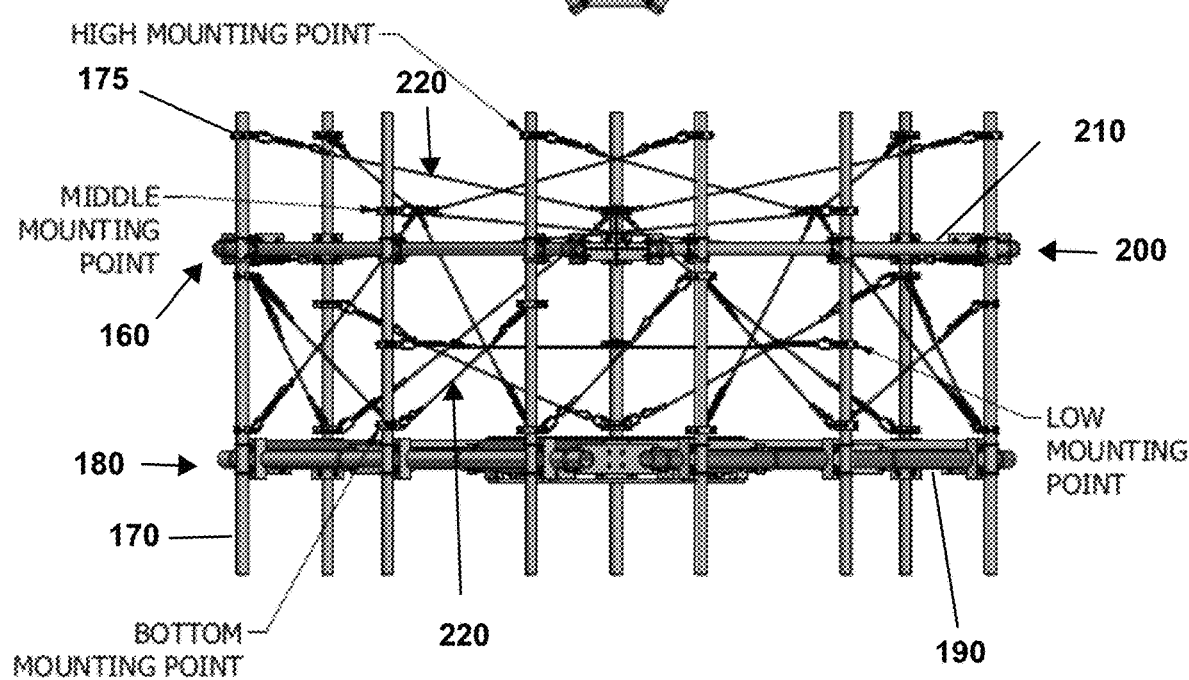

FIG. 2 is a perspective view of an antenna platform 130 including a top mounted avian nest deterrent system. Turning to FIGS. 2, 5A and 5B, the antenna platform includes three sides and has a triangular configuration. In other embodiments, the antenna platform 130 may include more than three sides. In some embodiments, the antenna platform 130 includes three or four sides, each side having an outer face 160 opposite the central support. One or more antenna masts 170 are attached to the outer face 160 of each of the at least three sides. In some embodiments, the antenna masts 170 may be attached by one or more braces or clamps 175. The antenna platform further includes a base level 180 defined by horizontal supports 190. The horizontal supports 190 may be connected to a support assembly 195 which provides rigidity to the antenna platform 130 and may further attach to the central support 110. The antenna may further include an upper level 200 defined by upper horizontal supports 210. An upper horizontal support 210 may be connected to an adjacent upper horizontal support 210 by a handrail corner plate 215.

A network 150 of fibers 220 is positioned above the base level 180 of the antenna platform 130. In an embodiment, the fibers 220 are clear nylon monofilament. In an embodiment, the fibers 220 contain no pigments or dyes. In an alternate embodiment, fibers 220 containing pigments and/or dyes may be used alone or in combination with the pigment and dye free fibers 220. The fiber network 150 may be attached to the antenna platform 130 at a plurality of connection points. The fibers 220 are attached at a plurality of connection points at various heights along the antenna masts 170 above the base level 180. As the fibers 220 diverge from the connection points, the paths of the fibers result in a spacing between the fibers which may allow materials or other animals which enter the system to escape the network. In some embodiments, the fibers 220 are spaced such that at least one point on each of two adjacent fibers is about 8 inches to about 24 inches, about 14 inches to about 22 inches, about 16 inches to about 20 inches, and/or about 18 inches apart and are attached to a combination of high, middle, low, and/or bottom connection points. While the figures illustrate an avian deterrent system having four levels of connection points, it is contemplated that embodiments of the avian deterrent system may include more or less than four levels of connection points.

High connection points are located near the top of the antenna masts 170 of the platform 130. In some embodiment, the high connection points are located less than 6.0 inches, less than 4.0 inches, less than 2.0 inches, at least 0.5 inches, at least 1.0 inches, from the top of the antenna mast 170. Middle connection points are located on the antenna masts 170 near the level of the upper horizontal supports 210. In some embodiments, the middle connection points are located at least 0.5 inches, at least 1.0 inches, at least 1.5 inches, at least 2.0 inches at least 2.5 inches, at least 3.0 inches, at least 4.0 inches, at least 5.0 inches, less than 12.0 inches, less than 10.0 inches, less than 8.0 inches, less than 7.0 inches, less than 6.0 inches, above the upper horizontal supports 210. Low connection points are located on the antenna mast approximately halfway between the upper horizontal supports 210 and lower horizontal supports 190. In some embodiments, a ratio of the distance from the low connection point to the upper horizontal supports 210 and the distance between the low connection point and the lower horizontal supports 190 is between 0.7 and 1.3. The bottom connection points are located on the antenna mast 170 near the level of the lower horizontal supports 190 or may be located directly on the lower horizontal supports 190. In some embodiments, the low connection points are located at least 0.2 inches, at least 0.5 inches, at least 1.0 inches, at least 1.5 inches, at least 2.0 inches at least 2.5 inches, at least 3.0 inches, at least 4.0 inches, at least 5.0 inches, less than 12.0 inches, less than 10.0 inches, less than 8.0 inches, less than 7.0 inches, less than 6.0 inches, above the lower horizontal supports 210. In one embodiment, at least one low connection point is located on the lower horizontal supports 190.

The fibers 220 may be attached between any two of the high connection points, middle connection points, lower connection points, and/or bottom connection points. In some embodiments, the fibers 220 form an angle of at least 5 degrees with a plane defined by the lower horizontal supports 190 of the platform 130.

In an alternate embodiment, fibers 220 may attached from the high connection points to the middle connection points make an angle of at least 11 degrees with a plane defined by the lower horizontal supports 190 of the platform 130. Fibers attached from the middle connection points to the handrail corner plates 215 make an angle of at least 5 degrees with a plane defined by the lower horizontal supports 190. Fibers attached from the low connection points to the bottom connection points make an angle of at least 13 degrees with a plane defined by the lower horizontal supports 190.

The various angles of the fibers 220 of the fibrous network 150 provide both a physical and visual deterrent to raptors attempting to nest. The angled fibers 220 do not present a level platform as a support for the nesting materials of the raptors. The angled fiber 220 also present a visual deterrent due to the use of clear monofilament fiber 220 as a network 150 material. Without being bound to a particular theory, it is believed that clear fibers, such as clear nylon monofilament are difficult for the raptors to see and thus the raptors are unable to determine if an obstacle is present, making it difficult to navigate through the network of fibers 220 to the antenna platform 130.

Figure 3:
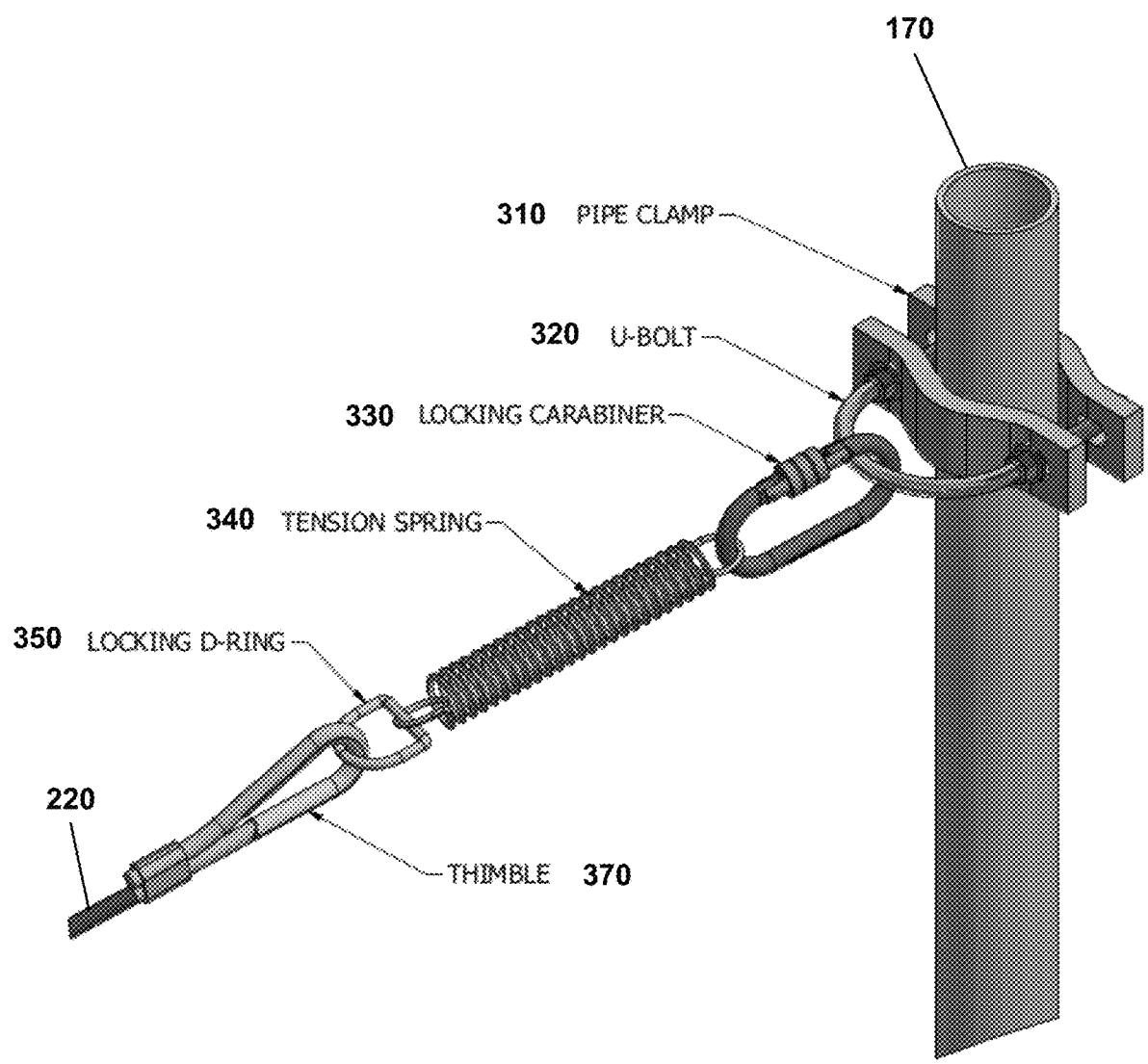
FIG. 3 is an expanded view of the attachment assembly for connecting the fiber network to the antenna platform of FIG. 2, region B, according to an embodiment.
Figure 4:
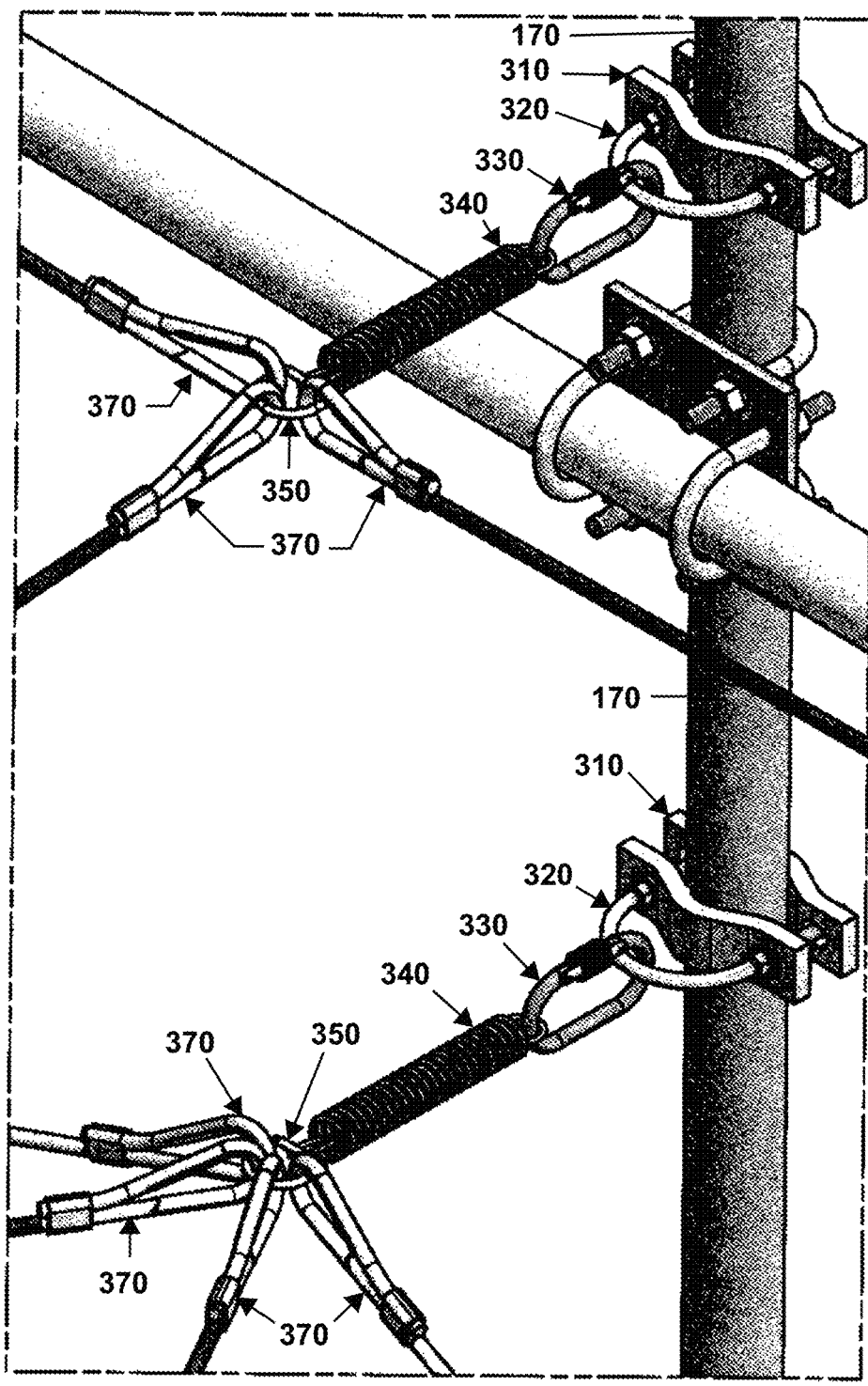
FIG. 4 is an expanded view of a plurality of fibers attached to the antenna platform via the attachment assembly of FIG. 2, region A, according to an embodiment.

FIG. 3 is a view of an attachment assembly 360 for connecting the fibers 220 to the connection points. In the example of FIG. 3, a pipe clamp 310 is secured to an antenna mast 170. A U-bolt 320 is fixably attached to the pipe clamp 310. A locking carabiner 330 is attached to the U-bolt 320 and a first end of a tension spring 340 is also attached to the locking carabiner 330. A second end of the tension spring 340 is attached to a locking D-ring 350, thus forming the attachment assembly 360. FIG. 4 is a perspective view of attachment assemblies 360 having pluralities of fibers 220 attached thereto via the locking D-ring 350.

A releasable fastener, such as a thimble 370, or other device (e.g., carabiner, clasp, etc.) terminates the fiber 220 in a way the allows to the fiber 220 to be removably secured to the attachment assembly 360 via the locking D-ring 350. The attachment assemblies 360 in conjunction with the releasable fastener 370 terminating the fiber 220 provide service technicians the ability to easily connect and disconnect some or all of the network 150 of fibers 220 in order to more easily service the tower 100. It will be appreciated that in some embodiments, the fibers 220 are terminated at both ends with the releasable fastener.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A telecommunications tower having an avian nest deterrent system attached thereto comprising:
   a telecommunications tower including a central support and at least one antenna platform, the antenna platform including at least one horizontal support, at least one antenna mast, and a network of fibers attached to at least one of the horizontal support and antenna mast, wherein the network of fibers does not extend a height of the telecommunications tower;
   wherein the network of fibers is attached to the at least one of the horizontal support or the at least one antenna mast via a combination of at least two of one high connection point, one middle connection point, one low connection point, or one base connection point;
   wherein:
   the at least one high connection point is located less than 6.0 inches from a top of the antenna mast;
   the at least one middle connection point is located at least 0.5 inches, and less than 12.0 inches, above an upper horizontal support;
   a ratio of a distance from the low connection point to the upper horizontal support and a distance between the low connection point and a lower horizontal support is between 0.7 and 1.3; and
   the at least one bottom connection point is located on the antenna mast at least 0.2 inches, and less than 12.0 inches above the lower horizontal support.

2. The telecommunications tower of claim 1, wherein the network of fibers includes nylon monofilaments, polyvinylidene fluoride fibers, ultra-high molecular polyethylene fibers, or combinations thereof.

3. The telecommunications tower of claim 1, wherein the network of fibers includes fibers having a diameter of 0.01 inches to 0.8 inches.

4. The telecommunications tower of claim 3, wherein the network of fibers includes fibers having a diameter of 0.044 inches to 0.052 inches.

5. The telecommunications tower of claim 1, wherein the network of fibers includes fibers which are clear, translucent, dyed, or pigmented.

6. The telecommunications tower of claim 1, wherein the telecommunications tower includes
   at least two antenna platforms, the at least two antenna platforms including at least one horizontal support, at least one antenna mast, and a network of fibers attached to at least one of the horizontal support and antenna mast, and wherein the network of fibers extends between the at least two antenna platforms and defines an avian deterred space between the at least two antenna platforms.

7. The telecommunications tower of claim 6, wherein the network of fibers includes fibers spaced 8 to 24 inches apart.

8. A telecommunications tower having an avian nest deterrent system attached thereto comprising:
   a telecommunications tower including a central support and at least one antenna platform, the antenna platform including at least one horizontal support, at least one antenna mast, and a network of fibers attached to at least one of the horizontal support and antenna mast, wherein the network of fibers does not extend a height of the telecommunications tower;
   wherein the network of fibers is attached to the at least one of the horizontal support or the at least one antenna mast via a combination of at least two of one high connection point, one middle connection point, one low connection point, or one base connection point;
   wherein:
   the at least one high connection point is located less than 6.0 inches from a top of the antenna mast;
   the at least one middle connection point is located at least 0.5 inches, and less than 12.0 inches, above an upper horizontal support;
   a ratio of a distance from the low connection point to the upper horizontal support and a distance between the low connection point and a lower horizontal support is between 0.7 and 1.3; and
   the at least one bottom connection point is located on the antenna mast at least 0.2 inches, and less than 12.0 inches above the lower horizontal support;
   wherein the network of fibers are attached between any two of high connection points, middle connection points, lower connection points, or bottom connection points, wherein the network of fibers form an angle of at least 5 degrees with a plane defined by the lower horizontal supports of the platform.

9. The telecommunications tower of claim 6 wherein at least one fiber of the network of fibers is attached to at least one of the horizontal support or antenna mast via a pipe clamp to which is attached a U-bolt to which is attached a locking carabiner to which is attached a first end of a tension spring to which is attached a locking D-ring at a second end of the tension spring.

* * * * *